United States Patent [19]

Risius et al.

[11] Patent Number: 5,008,057

[45] Date of Patent: Apr. 16, 1991

[54] METHOD OF PRODUCING A STRUCTURE, MORE PARTICULARLY A WOODEN STRUCTURE, IN THE SURFACE OF A HARDENED FIBREBOARD

[75] Inventors: Harald Risius, Aurich; Wilhelm Oldemeyer, Meppen, both of Fed. Rep. of Germany

[73] Assignee: Glunz Aktiengesellschaft, Hamm, Fed. Rep. of Germany

[21] Appl. No.: 443,654

[22] Filed: Nov. 29, 1989

[30] Foreign Application Priority Data

Nov. 30, 1988 [DE] Fed. Rep. of Germany ....... 3840292

[51] Int. Cl.[5] .............................................. B29C 59/02

[52] U.S. Cl. ...................................... 264/134; 264/119; 264/137; 264/293

[58] Field of Search ............... 264/119, 137, 134, 293, 264/320, 322

[56] References Cited

U.S. PATENT DOCUMENTS

| | | | |
|---|---|---|---|
| 4,007,076 | 2/1977 | Clarke et al. | 156/62.8 |
| 4,073,672 | 2/1978 | Clarke et al. | 156/219 |
| 4,237,087 | 12/1980 | Jones | 264/134 |
| 4,275,027 | 6/1981 | Luck et al. | 264/118 |

FOREIGN PATENT DOCUMENTS

| | | | |
|---|---|---|---|
| 55-123447 | 9/1980 | Japan | 264/119 |

*Primary Examiner*—Mary Lynntheisen

*Attorney, Agent, or Firm*—Thomas, Kerr & Kayden

[57] ABSTRACT

The disclosure herein describes a method for producing a structure, more particularly a wooden structure, in the surface of a hardened fibreboard, especially a medium-density fibreboard; it comprises the steps of: applying a resin-water mix to the surface of the fibreboard on one or both sides to soften and penetrate into the surface of the fibreboard; and pressing the fibreboard with a short-cycle press, under the action of pressure and heat, and using a structured pressure-plate. The water-part of the resin-water mix is caused to evaporate and the resin-part to cure, whereas the structure of the pressure-plate is moulded into the surface of the fibreboard.

7 Claims, No Drawings

METHOD OF PRODUCING A STRUCTURE, MORE PARTICULARLY A WOODEN STRUCTURE, IN THE SURFACE OF A HARDENED FIBREBOARD

FIELD OF THE INVENTION

The invention relates to a method for producing a structure, more particularly a wooden structure, in the surface of fibreboards, especially medium-density fibreboards, wherein a substance is applied, as an initial material, to the surface of a hardened fibreboard, the fibreboard being then pressed, with the substance, in a short-cycle press, under the action of pressure and heat and using a structured pressure-plate.

BACKGROUND OF THE INVENTION

It is known to fashion the surfaces of fibreboards in such a manner that they no longer appear as flat surfaces but have a specific structure, the structure varying as required. Structured surfaces of this kind are needed particularly in the manufacture of furniture. For example, in the manufacture of kitchen cupboards, but also in carcases, use is made of fibreboards and other panels made of wood where a structured surface in relief is desired.

The present invention is concerned with producing a structure on the surface of a fibreboard which has already been hardened, i.e. which has already been subjected to the usual production processes.

According to one known method of the type described at the beginning hereof, paper coated with melamine resin is placed upon the fibreboard, chipboard or the like after it has been hardened and the board is pressed, as the initial material, with the melamine-coated resin, in a short-cycle press. A short-cycle press is to be understood to be a known type of press using pressures of up to about 27 kp/cm$^2$ and temperatures of up to about 180° C. A structured pressure-plate is placed upon the layer of paper and this results in the structure of the pressure-plate being moulded into the paper, i.e. into the surface of the fibreboard. If smooth pressure-plates are used, glossy flat surfaces are obtained. In practice, the structure assumes only the surfaces of melamine-coated paper applied to the initial material, and the actual surface of the fibreboard is scarcely, or only slightly moulded. This structure then appears on the surface of the fibreboard. The advantage of this known method is that the surface of the fibreboard is protected, to some extent, by the melamine paper, and the surface of the paper is sealed or closed by the curing of the melamine resin. The known method is comparatively inexpensive and can thus compete with a lacquer-coating. The disadvantage is that the structure thus obtained are not very decorative. The surface of the paper usually remains visible and it is impossible, or very difficult, to obtain a natural wood appealing structure in this way. For this reason, this method of treating fibreboard surfaces is reserved mainly for furniture carcases and is not used for decorative surfaces.

There are also methods which, like the method according to the application, are concerned with applying a structure directly to the surface of a fibreboard. Such fibreboards are initially produced by conventional methods. The boards are then treated in a moiré-calender, the rolls of which are structured on one or both sides. The structure is burned into the surface of the fibreboard under the action of pressure and heat.

The temperatures used may reach about 1100° C. at the surface of the rolls. The colour of the burned-in structure may be varied by varying the pressure, heat and the time taken for the board to pass through the calender. One advantage is that it is possible, with this method, to obtain a structure in the surface and not only on the surface of a fibreboard. There is also no need to use the melamine-impregnated paper. The disadvantage of this method is that the tinting of the burning-in is not always uniform. Nor is the appearance satisfactory if a natural wood structure is to be imitated. Furthermore, the surface of the board is rough and unprotected after the burning-in and, during subsequent processing, there may be mechanical damage or damage caused by moisture. This cannot be eliminated by grinding because this alters the burned surface to such an extent that the damage becomes even more obvious. Another disadvantage is that this process requires special installations and calenders and, if the results are to be in any way constant, pressure and temperature control must be extremely accurate.

In the case of another known method, especially for the decorative surfaces of furniture, the initial material used is a cured chipboard which is made particularly soft. The surface of this cured chipboard is indented and crushed by the use of pressure and heat, whereby macro-structures, such as grooves, ridges, reliefs and the like may be produced in the surface. Temperatures of up to about 180° C. are used. The depth of the embossed grooves may be as much as 8 mm. Foils and papers may also be melted onto the surface. Surfaces thus treated may also be lacquered subsequently. Fortunately, this known method eliminates the need of a milling operation in order to produce the relief, but the optical effect is quite similar. The disadvantage of this method is that it requires presses having very high operating pressures. Furthermore, it can be used only for particularly soft chipboard.

DETAILED DESCRIPTION OF THE INVENTION

It is an object of the invention to provide a method whereby it is possible, using known equipment, more particularly short-cycle presses, to apply a structure, especially a wooden structure, directly to the surface of a fibreboard, more particularly a medium-density fibreboard.

According to the invention, this is accomplished in that the substance used is a resin-water mix. Thus, paper coated with melamine resin is no longer applied to the surface of the fibreboard; instead, the resin-water mix is applied. This mix penetrates into and softens the surface of the cured fibreboard, so that subsequent pressing in the short-cycle press allows the structure of the pressure-plate to be moulded into the surface. This cures the resin-part of the mix while the water evaporates. In this way, the structure is made in the surface and not at or on the surface, which is essential if an improved decorative appearance is to be obtained. The actual surface of the fibreboard is moulded, since the structure is embossed into it. There is no need for a disturbing layer of paper or a piece of foil on the surface. Such media as paper, foil and the like are eliminated and this also reduces production costs. Another advantage is that the tools for further processing the structures take much longer to become dull and thus have longer service-lives. Especially during the milling of edges of surfaces produced by using melamine-coated paper, it is known that the milling tools soon become dull at the locations where the paper is removed by the milling operation. When milling the fibreboard treated according to the new method, especially when milling a rounded edge, the material of the fibreboard is milled directly and this eliminates cracks in the transition between the fibreboard and the paper, such as arise in the prior art. Filling work, also needed in the prior art, is also eliminated. Another substantial advantage is that the resin of the resin-water mix, after curing, also seals the treated surface. This not only provides protection, but also provides savings during subsequent painting, since the closed surface of the cured resin consumes less paint. Surprisingly enough, painting produces a surface which is very hard to distinguish from a painted natural wood surface. The use of a resin-water mix increases the amount of resin in the surface. This also increases resistance to moisture and chemicals which is not only significant for the end-product but is also an advantage during all further processing of the treated boards, right up to production of pieces of furniture. The use of a wooden structure creates a particularly natural appearance, since it is embossed into the surface of the board. It is, of course, possible to produce other structures in this way, especially microstructures.

It is desirable to use melamine as the resin in the resin-water mix. This is a resin in normal use in the chipboard and fibreboard industry. It is not only inexpensive, but the users of resins are already familiar with it. But other resins are, of course, also suitable.

The resin-water mix may contain between 25 and 50, preferably 30% of resin, i.e. it may contain 30% of resin and 70% of water, for example. This shows how important is the presence of water. The pressure and heat used during moulding convert the water into steam which also penetrates, to a certain depth, into the surface of the fibreboard, making it soft and mouldable so that it accepts the structure of the pressure-plate.

It is desirable for structurized pressure-plates to have a roughness depth of between 100 and 200, preferably about 180μ. These structures are therefore deeper than those used in the connection to the melamine-coated papers. The depth of the structure is, of course, governed by the effect desired. However, natural wood structures can easily be obtained with the limits given.

In pressing the surfaces wetted with the resin-water mix, it is possible to use pressures of between 20 and 30 $kp/cm^2$ and temperatures of between 150° and 200° C. at the surface of the pressure-plate. The treatment may be applied to one or both sides of the fibreboard. Even when it is applied to one side only, the boards do not lose their straightness. This is an advantage as compared with the use of melamine-coated papers, since these must always be applied to both sides if the boards are to remain straight.

It has been found advantageous to wet the surfaces of the fibreboards with about 20 to 40 $g/m^2$ of the resin-water mix. This relatively small amount is sufficient to achieve the desired structured surface.

It will be obvious to those skilled in the art that variations and modifications of the disclosed embodiments of the invention might be made without departing from the spirit and scope of the invention as defined by the following claims.

The embodiments of the invention in which an exclusive property or privilege is claimed are defined in the following claims:

1. A method for producing a wooden structure in an initially uncoated surface of a hardened fibreboard, comprising the steps of: applying an initial coating of a resin-water mix to the uncoated surface of the fibreboard on one or both sides to soften and penetrate into the surface of the fibreboard; molding the wooden structure into the surface of the softened fibreboard by pressing said fibreboard with a short cycle press, under the action of pressure and heat, and using a structured pressure-plate to evaporate the water-part of the resin-water mix and to cure the resin part, whereby the structure of the pressure-plate is molded into the surface of the fibreboard.

2. A method according to claim 1, wherein the resin used is a melamine.

3. A method according to claim 1 wherein the resin-water mix contains between 25 and 50% of resin.

4. A method according to claim 1, wherein the structured pressure-plate is used with a roughness-depth of between 100 and 200μ.

5. A method according to claim 1, wherein in pressing the surface wetted with the resin-water mix, pressures of between 20 and 30 $kp/cm^2$ and temperatures of between 150° and 200° C. at the surface of the pressure-plate are used.

6. A method according to claim 1, wherein the surface of the fibreboard is wetted with about 20 to 40 $g/m^2$ of the resin-water mix.

7. A method for producing a structure in one or more uncoated surfaces of a hardened fibreboard comprising the steps of:

applying a melamine-water mix containing approximately 30% melamine to at least one of the uncoated surfaces of the fibreboard to wet the surface with from 30 to 40 $g/m^2$ of the mix, pressing the surface of the fibreboard with a short cycle press having a structured pressure plate with a roughness depth of approximately 180μ at a pressure of between 20 and 30 $kp/cm^2$ and temperature of between 150° and 200° at the surface of the pressure plate, maintaining the pressure and temperature for a period sufficient to evaporate the water, to soften the fibreboard and to cure the melamine in the mix, whereby the structure of the pressure plate is molded into the surface of the fibreboard.

* * * * *